United States Patent Office 3,255,192
Patented June 7, 1966

3,255,192
CATALYTIC OXIDATION OF ALKYLQUINOX-
ALINES TO FORM QUINOXALINECARBOX-
YLIC ACIDS
Yu-Wei Chang, Wilmington, Del., assignor to E. I. du
Pont de Nemours and Company, Wilmington, Del., a
corporation of Delaware
No Drawing. Filed Nov. 30, 1962, Ser. No. 241,127
6 Claims. (Cl. 260—250)

This invention is directed to a novel class of hydroxyquinoxalinecarboxylic acids and to the novel process for the preparation of said novel hydroxyquinoxalinecarboxylic acid compounds.

These novel hydroxyquinoxalinecarboxylic acids are valuable intermediates for use in the manufacture of dyes, particularly of fiber-reactive dyes.

It is, therefore, an object of the present invention to provide 2- and/or 3-hydroxy-6-quinoxalinecarboxylic acids, 2- and/or 3-hydroxy-6,7-quinoxalinedicarboxylic acids, 2,3-dihydroxy-6-quinoxalinecarboxylic acids and 2,3-dihydroxy-6,7-quinoxalinedicarboxylic acids in high purity and by economical means.

It is another object of this invention to provide novel quinoxalinecarboxylic acid compounds which are useful as wool or vat dye intermediates.

These and other objects will become apparent from the following description and claims.

It has been proposed to prepare 2,3-dihydroxy-6-quinoxalinecarboxylic acid (British Patent 315,451 (1929), pages 2–3) by treating 3,4-diaminobenzoic acid with diethyl oxalate. This method, however, has been found to be not suitable for economical, large-scale manufacture of the proposed quinoxalinecarboxylic acids. Furthermore, the diaminobenzenecarboxylic acid starting materials for this proposed process are not readily available for many of the hydroxyquinoxalinecarboxylic acids provided by the present novel process.

Previous attempts have been made to oxidize the 2 (or 3)-hydroxy- or 2,3-dihydroxyquinoxalines which carry 6-alkyl, 6,7-dialkyl or 6-alkyl-7-carboxylic acid substituents and mixtures of said quinoxalines. These hydroxyquinoxalines are represented by the formula:

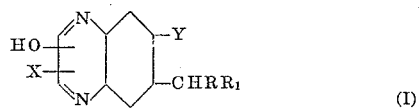
(I)

wherein X is H or OH and R and $R_1$ are hydrogen or $C_1$ to $C_4$ alkyl radicals and Y is H, —$CHRR_1$ or COOH.

These previous attempts to oxidize compounds of Formula I have generally failed. For example, the conventional chemical oxidation processes (using dichromate or permanganate), as applied to alkyl aromatic hydrocarbons to provide aromatic carboxylic acids, fail when applied to compounds of Formula I because either the benzo ring of the benzodiazine nucleus or the whole heterocyclic molecule is ruptured. Alternately, the conventional nitric acid oxidation method usually leads to nitro derivatives. The insolubility of the hydroxyalkylquinoxalines in the reaction medium is another factor which makes their oxidation difficult by heretofore described methods.

There has now been found a novel process for the oxidation of compounds of Formula I, as defined and discussed hereinafter, to form compounds represented by the formula

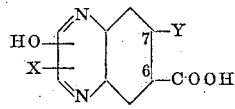
(II)

wherein X and Y are defined as above. This novel process is unique in that it provides hydroxyquinoxalinecarboxylic acids of high purity in good to excellent yields by commercially feasible methods. It was altogether unexpected that this novel process for oxidizing the hydroxyalkylquinoxalines represented by Formula I by suspending said hydroxyalkylquinoxalines in an organic solvent medium would be so successful whereas other, conventional chemical oxidation methods destroyed the sensitive hydroxy quinoxaline molecule.

More specifically, the present invention is directed to a process for producing hydroxyquinoxalinecarboxylic acids of the formula

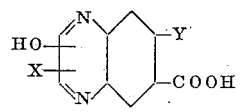

wherein X is H or OH, Y is H, $CHRR_1$ or —COOH, and R and $R_1$ are hydrogen or $C_1$ to $C_4$ alkyl radicals, which process comprises oxidizing hydroxyalkylquinoxalines having the structure

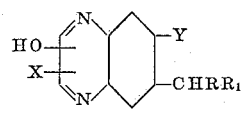

wherein X, Y, R and $R_1$ are defined as above, said oxidation being conducted in the liquid phase in an inert liquid medium with molecular oxygen in the presence of an oxidation catalyst system comprising cobalt cations, manganese cations and bromide ions; and recovering from the reaction mixtures said hydroxyquinoxalinecarboxylic acids.

The present invention is also directed to novel compounds having the formula

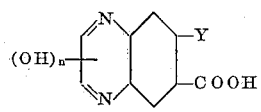

wherein $n$ is 1 or 2 and Y is —COOH or an alkyl of 1 to 2 carbon atoms; provided that when $n$ is 1, Y can be H, COOH, or an alkyl of 1 to 2 carbon atoms.

The present invention is more specifically directed to novel compounds having the formula

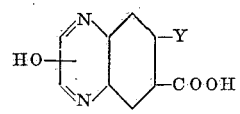

wherein Y is H, —COOH, —$CH_3$ or —$C_2H_5$ and the OH is in either the 2 position or the 3 position of the heterocyclic ring.

This invention is also more specifically directed to novel compounds having the formula

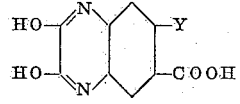

wherein Y is —COOH, —$CH_3$ or —$C_2H_5$.

This invention is also directed to novel compositions comprising compounds having the structures

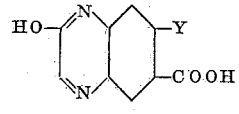

and,

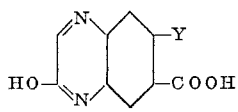

wherein Y is H, —COOH, —CH$_3$ or C$_2$H$_5$.

Representative examples of the hydroxyalkylquinoxalines suitable as starting materials in the practice of this invention are as follows:

2,3-dihydroxy-6-methylquinoxaline;
2,3-dihydroxy-6-ethylquinoxaline;
2,3-dihydroxy-6-n-propylquinoxaline;
2,3-dihydroxy-6-isopropylquinoxaline;
2,3-dihydroxy-6-butylquinoxaline;
2,3-dihydroxy-6-sec-butylquinoxaline;
2,3-dihydroxy-6-isobutylquinoxaline;
2,3-dihydroxy-6-amylquinoxaline;
2,3-dihydroxy-6-isoamylquinoxaline;
2,3-dihydroxy-6,7-dimethylquinoxaline;
2,3-dihydroxy-6,7-diethylquinoxaline;
2,3-dihydroxy-6-methyl-7-quinoxalinecarboxylic acid;
2,3-dihydroxy-6-ethyl-7-quinoxalinecarboxylic acid;
2-hydroxy-6-methylquinoxaline;
3-hydroxy-6-butylquinoxaline;
2-hydroxy-6,7-dimethylquinoxaline;
2-hydroxy-6-ethylquinoxaline;
2-hydroxy-6-ethyl-7-quinoxalinecarboxylic acid and
3-hydroxy-6-methyl-7-quinoxalinecarboxylic acid and mixtures of the above compounds.

The hydroxyalkylquinoxalines are prepared from 4-alkyl- or 4,5-dialkyl-orthophenylenediamines by reaction with a glyoxalate ester as described in J. Am. Chem. Soc. 71, 6 (1949), to give the monohydroxyquinoxaline mixtures or with an oxalate ester as described in British Patent 315,451 and in French Patent 1,193,734 to afford the dihydroxyquinoxaline. It is desirable that the hydroxyalkylquinoxalines be free of contaminants which would interfere with the oxidation catalyst.

Molecular oxygen is the oxidizing agent in this novel process. It may be used alone or as a mixture such as air.

The cobalt and manganese cations required as components of the catalyst system may be obtained from any readily available salt of these metals. Representative salts are cobalt acetate, manganese acetate, manganese bromide, cobalt bromide, cobalt linoleate, cobalt naphthenate, cobalt octoate, cobalt sulfate, manganese linoleate, manganese naphthenate, manganese stearate and manganese sulfate. The valence state of the metal in the salt is not important since the valence apparently is continually changed during the oxidation-reduction cycle of the reaction during the process.

Although some of the desired quinoxalinecarboxylic acids can be obtained when the oxidation is carried out in the absence of bromide ion, much better results are obtained if the bromide ion is present either as hydrobromic acid or as a heavy metal salt such as nickelous bromide, ceric bromide or manganese bromide.

Certain sources of bromide ion, such as ammonium bromide, give results inferior to those obtained with hydrobromic acid.

The preferred catalyst system is a mixture of equal parts by weight of cobalt (II) acetate, manganese (II) acetate and hydrobromic acid.

Although the hydroxyalkylquinoxalines are relatively high melting, highly insoluble materials and it is desirable to carry out the oxidation at temperatures below their melting points, a liquid medium which is inert to the oxidizing conditions is used. Suitable media which are liquid at the reaction temperature are the lower aliphatic acids containing from two to about seven carbon atoms free from tertiary hydrogen atoms. Representative acids are acetic acid, propionic acid, butyric acid, valeric acid, caproic acid, heptanoic acid and benzoic acid. The preferred acid is acetic acid in view of its ready availability, inexpensiveness and the ease with which the product can be isolated from it. Mixtures of acetic acid and benzene may also be used.

In carrying out the process of this invention, about 3 to 10 parts of inert liquid are used per part of quinoxaline derivative. Enough liquid is used to provide a readily stirrable reaction medium. One part of the catalyst mixture is generally used for about ten parts of the quinoxaline being oxidized. Much less than 1 part of catalyst per 10 parts of quinoxaline is impractical, in that it results in long reaction times and incomplete conversions. When more than about 2 parts of catalyst per 10 parts of quinoxaline are used the quinoxaline ring begins to be oxidized and the yield falls off. The choice of the proper amount of catalyst within these limits is readily determined by those experienced in this field.

The essential components of the catalyst system are the cobalt cation, the manganese cation and the bromide anion. The source of these ions is not critical and will be based upon availability and cost. The relative amounts of these components in the catalyst system will vary depending upon conditions such as the alkylquinoxaline being oxidized, the solubility of the catalysts in the reaction medium, whether pure oxygen or air is being used as the oxidizing agent, and upon other factors apparent to the skilled practitioner in this field. Generally, the catalyst system will contain the cobalt cation, the manganese cation and the bromide anion in the molar ratio of 1–2:1–2:1–4, respectively. A preferred catalyst system consists of 1.5 parts by weight of cobaltous acetate tetrahydrate, 1.5 parts by weight of manganese acetate tetrahydrate and 3.0 parts by weight of 48% aqueous hydrobromic acid. In this system, the molar ratio of the essential ingredients is approximately 1:1:3.

A temperature of 150 to 170° C. is necessary to initiate the oxidation reaction. This reaction is quite exothermic and, once initiated, cooling may be necessary to maintain the temperature under about 220° C. Higher temperatures are to be avoided since they lead to decomposition and charring of the reactants and products.

Pressures in the range of 100 to 2500 p.s.i.g. are used, the amount of pressure chosen being sufficient to maintain a liquid phase reaction and also to maintain the proper rate of reaction. The preferred range is 150 to 800 p.s.i.g. with essentially pure oxygen. If pure oxygen is used, lower reaction pressures can be used than if the oxygen is diluted with another gas.

The time for completion of the reaction will range from 0.5 to 24 hours, generally from 2 to 4 hours. The termination of the reaction is evidenced by the cessation of use of oxygen or by the absence of drops in pressure.

The recovery of the hydroxyquinoxalinecarboxylic acid products is accomplished by the conventional method as hereinafter described.

Representative examples illustrating the present invention follow. All parts are by weight unless specified otherwise.

*Example I*

A pressure vessel is filled to about 60% of capacity with a mixture consisting of 40 parts 2,3-dihydroxy-6-methylquinoxaline (obtained by treating 3,4-diaminotoluene with oxalic acid), 160 parts of glacial acetic acid, 1.5 parts of cobalt acetate tetrahydrate, 1.5 parts of manganese acetate tetrahydrate and 3.0 parts of 48% aqueous hydrobromic acid. Oxygen gas is introduced into the vessel until a pressure of 300 p.s.i.g. is reached. While agitating the contents of the vessel continuously, the mixture is heated to about 160° C. at which time an exothermic reaction carries the temperature to about 200° C. This is followed by a rapid drop in pressure. More oxygen is introduced into the vessel until the pressure becomes constant at 300 p.s.i.g. while maintaining the temperature at 160° C.

The reaction is completed in about 2.5 hours, after which the reaction mass is cooled. The reaction product 2,3-dihydroxy - 6 - quinoxalinecarboxylic acid, is filtered off, washed with water and dried, to afford an 83% yield. The product thus obtained is satisfactory, as such, for commercial use.

When a purer form of 2,3-dihydroxy-6-quinoxalinecarboxylic acid is desired, the acid as obtained above, which contains a small amount (2 to 5%) of starting material as determined by potentiometric titration and ultra violet absorption spectrum (using peaks at 239 and 331 millimicrons in aqueous sodium hydroxide solution), may be purified as follows. The chemically pure derivative, 2,3-dichloro-6-quinoxalinecarbonyl chloride, is made by reacting the acid with phosgene in the presence of dimethylformamide in p-xylene as the reaction solvent. Since the 2,3-dichloro-6-methylquinoxaline is more soluble than the acid chloride in p-xylene, the pure acid chloride is separated from the partially concentrated solution. 2,3-dichloro-6-quinoxalinecarbonyl chloride, M.P. 114°–115° C. alkaline hydrolysis of this acid chloride in water, followed by precipitation with mineral acid, filtration and drying under high vacuum at 138° C. gives the pure 2,3-dihydroxy-6-quinoxalinecarboxylic acid.

When, in an alternate procedure, the oxygen is introduced into the reaction mixture at 160° C., pressures as low as about 150 p.s.i.g. are satisfactory for the reaction.

*Example II*

Repeating the procedure of Example I, except in that 2,3-dihydroxy-6-methylquinoxaline is replaced by 46 parts of 2,3-dihydroxy-6-propylquinoxaline, one obtains the 2,3-dichloro-6-quinoxalinecarbonyl chloride and the 2,3 - dihydroxy - 6 - quinoxalinecarboxylic acid in good yields.

Similarly, other 2,3-dihydroxy - 6 - alkylquinoxalines such as the ethyl, isopropyl, butyl, sec-butyl or sec-amyl may be oxidized to provide the same carboxylic acid and carbonyl chloride.

The various 4-alkyl-o-phenylene diamines used in the preparation of the hydroxyalkylquinoxalines are prepared as described in J. Am. Chem. Soc. 80, 1657 (1958). These diamines are converted to the corresponding dihydroxy-6-alkylquinoxalines by treating with oxalic acid.

*Example III*

Following the procedure of Example I, 40 parts of 2,3-dihydroxy-6,7-dimethylquinoxaline are oxidized in a mixture consisting of 160 parts of glacial acetic acid, 1.5 parts of cobalt acetate tetrahydrate, 1.5 parts of manganese acetate tetrahydrate and 3 parts of nickelous bromide at a temperature of 155° to 165° C. and an oxygen pressure of 600 p.s.i.g. for a period of 4 hours. Reaction is complete when introduction of oxygen is no longer required in order to maintain constant pressure. The mass is then cooled. The reaction products are subsequently filtered off, washed with water and dried.

The mixture thus obtained contains about 72–80% of the dicarboxylic acid (III) and small amounts of monocarboxylic acid (IV) and some unreacted starting material as determined by potentiometric titration.

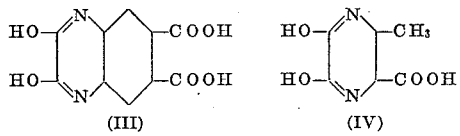

The major component of the mixture, dicarboxylic acid (III), is separated from the monocarboxylic acid (IV) and the starting material by reacting the crude products with phosgenedimethylformamide in p-xylene as the reaction solvent. In this manner, the dicarboxylic acid is transformed in nearly quantitative yield to its 2,3-dichloro-6,7-quinoxalinedicarboxylic acid anhydride (V) which is filtered off from the p-xylene solution. The 2,3-dichloro-6,7-quinoxalinecarboxylic acid anhydride (V) obtained is of high purity, M.P. 284–285° C. with decomposition. The following analysis confirms the structure:

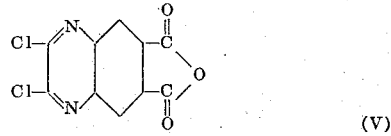

Calculated for $C_{10}H_2O_3N_2Cl_2$: C, 44.7%; H, 0.75%; Cl, 26.3%; N, 10.4%. Found: C, 44.9, 44.9%; H, 0.7, 0.8%; Cl, 26.5, 26.0%; N, 10.4, 10.3%.

Alkaline hydrolysis of (V) followed by acidification with mineral acid, filtration, washing and drying under high vacuum at 138° C. gives pure 2,3-dihydroxy-6,7-quinoxalinedicarboxylic acid (III), as monohydrate.

By concentrating the filtrate of p-xylene solution, 2,3-dichloro-6-methyl-7-quinoxalinecarbonyl chloride (VI) in crude form is separated. After fractional crystallization, the pure product (VI), M.P. 111°–112° C., has a composition $C_{10}H_5ON_2Cl_3$ as shown by analytical data. By alkaline hydrolysis of the pure product (VI) and subsequent isolation, the pure (IV) is thus obtained.

*Example IV*

Following the procedure of Example I, 40 parts of 2-hydroxy-6 (and 7)-methylquinoxalines (prepared from condensation of 3,4-diaminotoluene and butylglyoxalate) are oxidized in a mixture of 160 parts of glacial acetic acid, 1.5 parts of cobalt acetate, 1.5 parts of manganese acetate and 3.0 parts of 48% aqueous hydrobromic acid at a temperature of 160–165° C. and an oxygen pressure of 300–400 p.s.i.g. for a period of 2.5 hours. After the reaction is completed, the crude product is isolated by filtration, washing and drying. It consists of a mixture of 2-hydroxy-6 (and 7)-quinoxalinecarboxylic acids and small amounts of unreacted starting material.

After treatment of this crude product with phosgene-dimethylformamide in p-xylene, the mixed 2-chloro-6 (and 7)-quinoxalinecarbonyl chlorides are separated from the partially concentrated p-xylene solution. The mixed 2-chloro-6 (and 7)-quinoxalinecarbonyl chlorides, B.P. 150° C./0.6 mm., is fractionally crystallized from cyclohexane to afford the pure components, 2-chloro-6-quinoxalinecarbonyl chloride, M.P. 127°–129° C. and 2-chloro-7-quinoxalinecarbonyl chloride, M.P. 120°–122° C. as shown by analyses. Alkaline hydrolysis of these pure 2,6 and 2,7 isomers followed by acidification, filtration, washing and drying under high vacuum at 160° C. give, respectively, the pure 2-hydroxy-6-quinoxalinecarboxylic acid and 2-hydroxy-7-quinoxalinecarboxylic acid.

The same pure carboxylic acids result when one starts with either the pure 2-hydroxy-6-methylquinoxaline or the 7-methylquinoxaline isomer in the above oxidation.

*Example V*

The experiment described in Example I is repeated except that air is used under a pressure of 1500–2000 p.s.i.g. and the reaction time is extended to 6 hours. Both the heat rise and pressure drops similar to those of Example I are observed. The product of 2,3-dihydroxy-6-quinoxalinecarboxylic acid is similarly isolated in good yield.

*Example VI*

The experiment described in Example I is repeated except that 2.0 parts of cobalt acetate tetrahydrate are used to replace 3.0 parts of the mixed cobalt acetate tetrahydrate and manganese acetate tetrahydrate. There are no sudden heat rises and only a negligible pressure drop. The product isolated shows an identical infra red spectrum to that of the starting material charged into the reaction vessel.

*Example VII*

The experiment described in Example I is repeated except that 3.0 parts of manganese acetate tetrahydrate are used to replace the equal amount of the mixed cobalt acetate tetrahydrate and manganese acetate tetrahydrate. Neither the sudden heat rises nor the pressure drop of Example I are observed. The product isolated contains no carboxylic acid grouping as indicated by potentiometric titration.

Examples VI and VII are included to show that the mixture of cobalt and manganese cations is necessary to obtain oxidation of the alkylquinoxalines. Neither cation alone with the bromide ion is an effective catalyst under the conditions of the process of this invention.

*Example VIII*

Following the procedure of Example I, 40 parts of 2,3-dihydroxy-6-methylquinoxaline are oxidized with oxygen under a pressure of 600 p.s.i.g. at 160° C. in the presence of 200 parts of glacial acetic acid, 3 parts of nickel bromide, 1.5 parts of cobalt acetate tetrahydrate and 1.5 parts of manganese acetate tetrahydrate. During oxidation there is a rapid temperature rise to 220° C. accompanied with a drop in pressure. Oxygen is fed into the reaction vessel to maintain the pressure at 600 p.s.i.g. When no further drop in pressure is noticed, the reaction vessel is cooled to room temperature and emptied. After filtering, the product is washed with acetic acid and then with water, followed by being dried at 80° C. in a vacuum oven. Titration of a portion of the product indicates that 2,3-dihydroxy-6-quinoxalinecarboxylic acid is present in high yield.

The chloroquinoxalinecarbonyl chlorides and chloroquinoxalinecarboxylic acid anhydrides, prepared as described in the above examples from the hydroxyquinoxalinecarboxylic acids, are useful intermediate in the production of fiber-reactive dyes. These dyes are made by reacting said carbonyl chloride or acid anhydride intermediates with dyes or dye intermediates which contain reactive amino groups. The resulting chloroquinoxalinecarbonylamino compounds comprise one of the newest classes or fiber-reactive dyes which is represented by the general formula

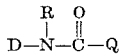

where D is the dye chromophore, R is hydrogen or lower alkyl, and Q in a mono- or di-chloroquinoxaline radical.

It is understood that the preceding examples are representative and that said examples may be varied within the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for producing hydroxyquinoxalinecarboxylic acids of the formula

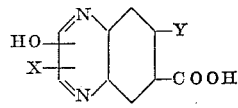

wherein X is selected from the group consisting of H and OH, Y is selected from the group consisting of H, $CHRR_1$ and —COOH, and wherein R and $R_1$ are selected from the group consisting of hydrogen and $C_1$–$C_4$ alkyl radicals, which process comprises oxidizing hydroxyalkylquinoxalines having the structure

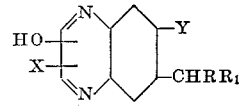

wherein X, Y, R, and $R_1$ are defined as above, said oxidation being conducted in the liquid phase in an inert liquid medium with molecular oxygen in the presence of an oxidation catalyst system comprising cobalt cations, manganese cations and bromide ions, and recovering from the reaction mixtures said hydroxyquinoxalinecarboxylic acids.

2. The process according to claim 1 wherein the catalyst system is a mixture of cobalt acetate, manganese acetate, and aqueous hydrobromic acid.

3. The process according to claim 1 wherein the liquid medium is a $C_2$ to $C_7$ aliphatic monocarboxylic acid.

4. The process according to claim 1 wherein the reaction temperature is 150° C. to 220° C. and the reaction pressure is 100 to 2500 p.s.i.g.

5. A compound of the formula

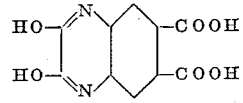

6. A compound of the formula

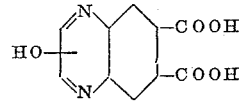

References Cited by the Examiner

UNITED STATES PATENTS 3,012,038  12/1961  O'Neil et al. _____ 260—295

FOREIGN PATENTS 315,451  7/1959  Great Britain.
644,016  10/1950  Great Britain.

NICHOLAS S. RIZZO, *Primary Examiner.*

HENRY R. JILES, *Assistant Examiner.*